United States Patent
Wimmer (10) Patent No.: US 9,366,270 B2
(45) Date of Patent: Jun. 14, 2016

(54) DAMPING VALVE ARRANGEMENT FOR A SEMIACTIVE VIBRATION DAMPER

(71) Applicant: WP Performance Systems GmbH, Munderfing (AT)

(72) Inventor: Johannes Wimmer, Kastl (DE)

(73) Assignee: WP Performance Systems GmbH, Munderfing (AT)

( * ) Notice: Subject to any disclaimer, the term of this patent is extended or adjusted under 35 U.S.C. 154(b) by 0 days.

(21) Appl. No.: 14/105,083

(22) Filed: Dec. 12, 2013

(65) Prior Publication Data

US 2014/0182696 A1     Jul. 3, 2014

(30) Foreign Application Priority Data

Dec. 20, 2012   (DE) .......................... 10 2012 112 729

(51) Int. Cl.
| | |
|---|---|
| *F16F 9/34* | (2006.01) |
| *F15B 11/044* | (2006.01) |
| *F16F 9/46* | (2006.01) |
| *F16F 9/348* | (2006.01) |

(52) U.S. Cl.
CPC ............. *F15B 11/0445* (2013.01); *F16F 9/465* (2013.01); *F16F 9/3484* (2013.01); *Y10T 137/0396* (2015.04)

(58) Field of Classification Search
CPC ....... F16F 9/348; F16F 9/3482; F16F 9/3484; F16F 9/3485; F16F 9/3488; F16F 9/464; F16F 9/465; F16F 9/461; F16K 31/0672; F16K 31/0624
See application file for complete search history.

(56) References Cited

U.S. PATENT DOCUMENTS

| | | | | |
|---|---|---|---|---|
| 5,044,563 | A | * | 9/1991 | Mesenich ............ F02M 51/005 239/585.4 |
| 5,860,631 | A | * | 1/1999 | Feigel ......................... 251/30.03 |
| 8,770,363 | B2 | * | 7/2014 | Sonsterod et al. ........ 188/322.13 |
| 2012/0186924 | A1 | * | 7/2012 | Hoven et al. ............. 188/322.13 |
| 2012/0273311 | A1 | * | 11/2012 | Beck ........................ 188/322.15 |
| 2013/0275003 | A1 | * | 10/2013 | Uchino et al. .................. 701/40 |

* cited by examiner

*Primary Examiner* — Nicholas J Lane
(74) *Attorney, Agent, or Firm* — Rod D. Baker (57) ABSTRACT

A damping valve arrangement is provided for controlling a pilot pressure that exerts influence on a control chamber of a damping device of a vibration damper through a control fluid, with an armature that is displaceable by the activity of an electrically energizable coil and provided in a housing, which armature includes a guide pin on which a first spring washer is provided and braces the guide pin. The first spring washer is designed for changing the area of a flow-through opening of the damping valve arrangement through which a control fluid is able to flow.

14 Claims, 8 Drawing Sheets

FIG. 7 and

DAMPING VALVE ARRANGEMENT FOR A SEMIACTIVE VIBRATION DAMPER

CROSS-REFERENCE TO RELATED APPLICATIONS

This application claims the filing benefit of and priority to German Patent Application No. DE 10 2012 112 729.8 filed on 20 Dec. 2012, the entirety of which is incorporated herein by reference.

BACKGROUND OF THE INVENTION

1. Field of the Invention

The present invention relates to damping valves, specifically a damping valve arrangement for controlling a pilot pressure that exerts influence on a control chamber of a damping device of a vibration damper by means of a control fluid, with an armature that is displaceable by means of an electrically exercisable coil and provided in a housing. The armature comprises a guide pin on which a first spring washer is provided and braces the guide pin.

The invention further relates to a method for controlling a pilot pressure in a control chamber of a damping device of a vibration damper by means of a magnetically actuated armature of a valve arrangement, which armature changes the area of a flow-through opening in the valve arrangement, through which a control fluid flows.

2. Background Art

A pressure regulator for a valve of a shock absorber, in which a piston supported so as to be axially displaceable in two bushings is actuated by means of a solenoid, has been disclosed in patent publication WO 2009/157841 A1. In this case, the piston is supported on a spring washer that is able to generate an axial force but is unable to provide any radial guiding forces; radial guidance is provided by the two bushings. Consequently, when the piston is to be moved, the adhesion forces prevailing in the two bushings must first be overcome, leading to breakaway forces. This leads to the result that an undesirable hysteresis is created by an axially oscillating movement of the piston, hindering precise control of the displacement movement of the piston, and the breakaway forces also increase the inertia of the system in undesirable manner, which impedes rapid regulating movement.

A hydraulic vibration damper with adjustable damping force, which has a pressure regulating valve with a piston that is movable across a magnetic coil, has been disclosed in German patent publication DE 199 14 504 C5. In this case, the piston is guided inside a cylindrical sleeve, with the result that a movement of the piston again creates increased friction in the sleeve, which yet again leads to the problem of hysteresis and negatively affects the regulating speed of the system.

A shock absorber with adjustable damping force, in which the inertia of the piston in the pressure control valve (solenoid valve) is reducible, was disclosed in German patent application DE 10 2009 015 584 A1. In this context, the plunger is arranged in a bore so as to be guided by the wall. The arrangement of the plunger against the wall gives rise to adhesion effects due to friction, and the inertia of the system therefore cannot be reduced effectively.

A shock absorber with damping force control was disclosed in German patent application DE 10 2010 046 833 A1. The shock absorber is equipped with a solenoid that actuates a piston which is guided in a bore. Unavoidable eccentricities of the bore result in adhesion effects of the piston in the bore, and therewith again to the hysteresis problems described above. The eccentricity of the bore also causes the gap existing around the piston to assume variable values along the circumference of the piston between the outer wall of the piston and the inner wall of the bore; in the case of small gaps, this in turn causes the piston to become pressed against the bore due to magnetic force generated by the solenoid—which again increases the difficulties of breakaway forces and thus also the problem of hysteresis.

A guide diaphragm with crosspieces that is used in a valve arrangement with an excitation coil was disclosed in German patent DE 2 245 255 A1. In this context, the guide diaphragm serves to guide an armature in the radial and axial directions; said guide diaphragm performs no other function.

A controllable vibration damper comprising an electrically actuated magnet that actuates a control needle, which is able to block a flow-through area and uncover it again in continuously variable manner, was disclosed in German patent application DE 40 16 807 C2. A valve body is accommodated in a valve housing so as to be axially displaceable relative to the control needle, in such manner that the valve body is seated in a bore of the valve housing. In such arrangement, the control needle is designed to precede the valve body with regard to the axial movement thereof, so that the fluid flow of the main stage follows a fluid flow that fulfils a pilot function.

Finally, an adjustable damping valve device in which a set spring constructed as a disc guides an axle body in a valve housing was disclosed in German patent application DE 10 2011 075 909 A1. In this case, the set spring serves as a preloading member that acts on the axle body. The axle body is supported in a valve body that is accommodated in a guide bore of the valve housing. Here too, unavoidable eccentricities of the guide bore give rise to wall adhesion effects of the valve body with respect to the valve housing, and consequently to the hysteresis problems described previously.

Starting from the foregoing background, the object underlying the present invention for eliminating the drawbacks described is now to create a damping valve arrangement that permits precise, rapid control of the control pressure that acts on the control chamber, and also enables a predefined damping effect of a vibration damper in the event of any failure of the electrical power supply. A method for controlling a pilot pressure in a control chamber of a damping device in a vibration damper is also to be produced.

BRIEF DESCRIPTION OF THE DRAWINGS

In the following, the invention will be explained in greater detail with reference to the drawing. In the drawing.

DESCRIPTION OF THE INVENTION

There is disclosed hereby damping valve arrangement for controlling a pilot pressure that exerts influence on a control chamber of a damping device of a vibration damper by means of a control fluid, with an armature that is displaceable by means of an electrically exercisable coil and provided in a housing. The armature comprises a guide pin on which a first spring washer is provided and braces the guide pin. The damping valve arrangement may be fitted as a pressure control unit in a telescopic suspension fork strut of a motorcycle, for example, or in a shock absorber for some other type of motor vehicle.

The following disclosure also relates to a method for controlling a pilot pressure in a control chamber of a damping device of a vibration damper by means of a magnetically actuated armature of a valve arrangement, which armature changes the area of a flow-through opening in the valve arrangement, through which a control fluid flows.

German Patent Application No. DE 10 2012 112 729.8 is incorporated herein by reference.

According to the presently disclosed apparatus, the control pressure acting in the control chamber may be adjusted by controlling or modifying the pressure of a control fluid that is propagated into the control chamber. The control pressure may be applied to a valve body or travelling valve in the form of spring washers or shims, for example, which in turn exert influence on a passage allowing or limiting a fluid mass flow, by means of which a damping force may be generated which is directed opposite to a vibrating movement.

If the control pressure in the control chamber is high, the spring washers are only able to open the passage slightly, and a strong damping force is built up; if the control pressure in the control chamber is reduced by means of the damping valve arrangement, it exerts weaker pressing forces against the opening movement of the spring washers, the passage is opened wider and the damping forces are reduced. The operating behavior of a damper, of a wheel suspension component of a vehicle, for example, may be influenced in practically real time by means of a species-related damping valve arrangement according to this disclosure.

The invention provides a damping valve arrangement for controlling a pilot pressure acting on a control chamber of a damping device of a vibration damper through a control fluid, with an armature that is provided in a housing and is displaceable by means of an electrically energizable coil, which armature comprises a guide pin on which a first spring washer is provided to brace the guide pin, wherein the first spring washer is designed such that it changes the area of a flow-through opening in the valve arrangement, through which a control fluid may flow.

The pilot pressure of a control fluid (which may be for example a hydraulic oil, a fork oil provided in a telescopic suspension fork strut, an oil provided in a shock absorber, or another fluid circulating in the vibration damper for damping purposes) may be influenced by means of the damping valve arrangement. If the armature is charged with magnetic force by the electrically energizable coil so that the spring washer reduces the size of the flow-through opening through which the control fluid may pass, then when a wheel suspension component equipped with the vibration damper vibrates and causes displacement of the control fluid, pressure in the control fluid increases, and the pilot pressure in the control chamber increases. A stronger closing force is then exerted to counteract the opening movement of the spring washers or shims of a travelling valve on which the pilot pressure acts, and the damping in the system becomes stronger.

Accordingly, the first spring washer provided in the damping valve arrangement according to the present disclosure not only provides axial and radial guidance of the guide pin, but also ensures that it is able to alter the flow-through opening available for the control fluid to flow through, thus serving to integrate functions; the function of opening and closing the valve bore that is usually assured by the guide pin is performed by the spring washer. Consequently, it is also possible to configure the valve arrangement advantageously with regard to the inertia thereof, since a large valve bore is no longer controlled by a guide pin that has large dimensions for controlling the large valve bore and engenders correspondingly high inertia in the system. The damping valve arrangement according to the invention may be actuated very rapidly to quickly change the flow-through opening, and the response time of the system is correspondingly short.

Moreover, the magnetic force generated by the coil no longer has to overcome a breakaway torque created by the axial and radial guidance of the guide pin, and thus also of the armature with the spring washer, in a guide bore or in sleeves or bushings that are used to support the armature. Thus with the damping valve arrangement according to the invention, the problem of hysteresis associated with the known bearing no longer arises.

According to one feature of the invention, it is provided that the guide pin passes through the armature and has a second spring washer in the end area opposite the flow-through opening that provides outwardly radial bracing for the guide pin. In this way, the guide pin, and thus also the armature, is braced by two spring washers, so that the armature provided in a bore or opening of the housing does not bear against the bore wall. Wall adhesion effects thus are avoided, and the problem of hysteresis is also effectively eliminated or substantially minimized.

In addition, it is possible to influence the radial and axial rigidity of the spring washers in a wide range. A notable feature of the damping valve arrangement according to the present disclosure is that the spring washers have high rigidity in the radial direction, but low rigidity in the axial direction. The resulting benefit is the magnetic force required to effect a displacement movement of the armature may be kept small, so that the power requirement of the coil may also be reduced and the damping valve arrangement is of very compact construction, since the dimensions of the coil may be reduced compared with known arrangements. In this way, the damping valve arrangement according to the present disclosure is also suitable for fitting in a telescopic suspension fork strut of a motorcycle or bicycle. Such a telescopic suspension fork strut typically has a small diameter, which makes the integration of known damping valve arrangements difficult or impossible.

According to another aspect of the invention, it is provided that the spring washers guide the armature radially and axially in the housing, and keep it at a distance from the inner circumferential wall of the housing, that is to say at a distance from the bore for accommodating the armature in the housing. This distance may be reduced due to the precise radial and axial guidance of the armature by the spring washers, thereby increasing the magnetic forces, which in turn is helpful in keeping the design of the damping valve arrangement very compact and small.

According to another aspect of the invention, it is also provided that the armature is arranged inside the housing in such manner that it may be surrounded by fluid. In other words, this means that the armature is surrounded on all sides by the fluid that is controlled by the damping valve arrangement, which may also be the working fluid in the wheel suspension component—that is to say, the telescopic suspension fork strut or the shock absorber.

This makes it possible to reduce the installation space occupied by the damping valve arrangement further still, since the space that would be required to accommodate sealing fittings to keep the interior of the armature housing free from fluid is not required. In this context, the armature is configured such that the fluid forces in the axial and radial directions resulting from the pressure applied to the fluid cancel each other out, and the armature in particular is not displaced toward the wall of the bore by fluid forces.

According to another aspect of the invention, it is further provided that each of the spring washers has a central cutout to accommodate the guide pin, and each is furnished with cutouts that extend from a radially inner area of the spring washers to a radially outer area of the spring washers, and at the radially outer area extend along a part of the circumference of the spring washer and at a distance there from. These cutouts make it possible to adjust the axial rigidity of the spring washers relative to the radial rigidity thereof, depending on the requirements to which they are subject. In the present case, a radial rigidity equal to about 10 to 20 times that of the axial rigidity is achieved by this means. In addition, the cutouts also serve to ensure that the armature is surrounded by fluid on all sides, and that the fluid forces acting on the armature cancel each other out.

In this context, the spring washers may advantageously have three cutouts, which results in the creation of three connecting crosspieces between a circumferential inner area and a circumferential outer area of the respective spring washers, each crosspiece being of wide design, affording high radial rigidity.

A further result of this variant of the spring washers is that they may be produced by a simple manufacturing process, for example by stamping, and the manufacturing costs are thus lowered. Is has also proven advantageous if the ratio of the total surface area of the cutout in the spring washer to the total surface area of the spring washer without the cutouts is in the range from about 1 to 1.5 to about 1 to 3.

According to another aspect of the invention, it is further provided that the first spring washer has a radially inner area that is free from cutouts, and the area for changing the flow-through opening of the valve arrangement between the inner area and an annular body or a sleeve body furnished with an encircling collar may be shifted relative to the collar. The encircling collar forms a sealing edge. As the inner area moves closer to the collar, that is to say as the distance between the inner area and the collar grows smaller, the less area is also available to allow the control fluid stream to flow through and accordingly the more the control pressure increases in the direction of the control chamber. Conversely, if the inner area moves away from the encircling collar axially in the lengthwise direction of the valve arrangement, the area available to allow the control fluid to flow through becomes larger, the control pressure acting on the control chamber diminishes, damping is less pronounced.

According to yet another aspect of the invention, it is also provided that the damping valve arrangement comprises an armature counterpart in the form of a pipe end arranged axially between the first spring washer and the armature, which counterpart comprises an encircling collar that extends toward the first spring washer, and with which a radially inner area of the first spring washer may be brought into contact.

Viewed in the axial direction of the damping valve arrangement, the encircling collar of the armature counterpart is positioned opposite the encircling collar of the annular body. The first spring washer may be moved along the path between the two collars by means of the coil. When the first spring washer is positioned against the encircling collar of the annular body, a strong pilot pressure is built up in the control chamber. If the spring washer were positioned against the encircling collar of the armature counterpart in the form of a pipe end, a fluid flow of control fluid would be possible due to the spring motion of the wheel suspension component, but only as far as a closed ring chamber above the first spring washer, the control fluid would be trapped in the ring chamber.

In order to create a predefined damping effect even when the damping valve arrangement, or the coil, is not energized, the damping valve arrangement is equipped with a "fail-safe function." To this end, the damping valve arrangement comprises a bypass passage that is closable by a spring ring, which passage opens at a predefined opening pressure to allow a control fluid stream to flow between a fluid inflow passage toward the first spring washer and out of the ring chamber again. In this way, the fluid flowing through the fluid inflow passage toward the first spring washer is able to act on the spring ring and open the bypass passage, so that the fluid flow is possible in the direction out the ring chamber, a pilot pressure that is not uncontrollably high is created in the control chamber; consequently a predefined damping still takes place even in the event that the power supply to the armature fails.

According to a refinement of the invention, it is further provided that the guide pin may be braced against the effect of the spring washers by means of (for example) a manually operable spring device; this functions in such manner that the flow-through opening is opened under predefined conditions, so that on the one hand the armature may be braced securely into a fail-safe position, and on the other hand volume production tolerances may be compensated.

According to an advantageous embodiment of the damping valve arrangement, it is provided that the damping valve arrangement is designed to provide a control pressure in the range from about 1 bar to about 20 bar, acting on a travelling valve in a control chamber of a damping device of a vibration damper. This value range may be achieved by changing the control current that is applied to the coil from about 500 mA to about 1800 mA, that is, current values that are achievable through correspondingly small wire sizes in the trigger circuit of the coil. Miniaturization of the damping valve arrangement is possible thereby, and the arrangement is able to be integrated in the dimensionally limited installation space available in a vibration damper of a telescopic suspension fork strut.

The invention also provides a method for controlling a pilot pressure in a control chamber of a damping device in a vibration damper. The process is realized by means of a magnetically actuated armature of a valve arrangement that changes the area of a flow-through opening in the valve arrangement through which a control fluid is able to flow. A spring washer, preferably coupled with the armature, is displaced relative to an encircling collar by means of the armature and the area of the flow-through opening between the spring washer and the collar is thus modified, and the spring washer guides the armature radially and axially relative to a housing that accommodates the armature.

Accordingly, a functional integration is achieved with the method in such manner that, by means of the spring washer, the area of the flow-through opening that is available for the control fluid stream is changed, and at the same time the armature coupled with the spring washer is guided radially and axially in its armature housing.

Since the spring washer has low spring rigidity in the axial direction, and typical breakaway torques caused by physical contact between the armature and a bore in which the armature is accommodated may be avoided due to the guidance of the armature by means of the spring washer, the armature may be moved at a high rate of acceleration by the magnetic force acting thereon. Consequently, the pilot pressure in the control chamber may be altered very rapidly with the method disclosed herein, and pilot pressure regulation implemented in this way operates very quickly. Since the armature is arranged between the two tensioned spring washers, it is always in a defined position with no backlash, so that no additional fastening elements are necessary for the arrangement of the armature, and simple installation of the damping valve arrangement is also made possible.

Figure 1:
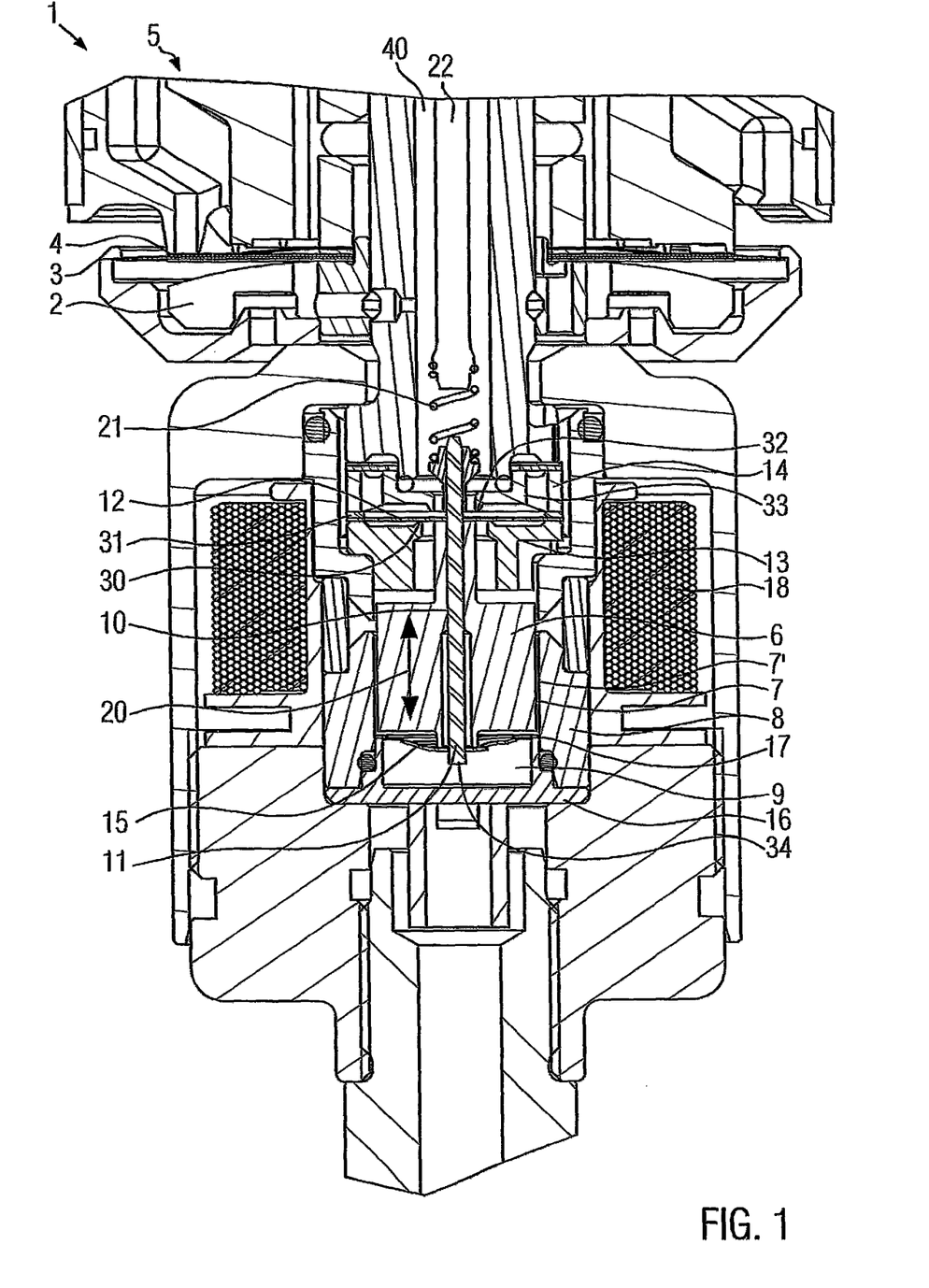
FIG. 1 shows a partial cutaway view of a damping valve arrangement according to an embodiment of the present invention.

Reference is made to FIG. 1 of the drawing, showing a partial cutaway view of an embodiment of a damping valve arrangement 1 according to present invention. Damping valve arrangement 1 may be fitted as a pressure control unit in a telescopic suspension fork strut of a motorcycle, for example, as is represented in FIG. 6 of the drawing, or in a shock absorber for a motor vehicle, as is represented in FIG. 7 of the drawing.

Both the telescopic suspension fork strut and the shock absorber perform oscillating movements during a journey made with the respective vehicle. The strut and absorber are therefore equipped with a vibration damper for damping vibrating motion, which may be a device equipped with a spring washer or a spring washer assembly, that is able to open a flow-through passage for a working fluid circulating therein in regulated or controlled manner. The resistance in the direction opposite to the flow movement may be adjusted by means of the unblocked opening cross-section, and a damping force may thus be exerted counter to the flow movement.

In order to control the opening cross-section, a control chamber may be provided to which a pilot pressure is applied, which pilot pressure exerts a compression force counter to the opening movement of the spring washer or the spring washer assembly, so that the opening cross section and therewith also the damping force may be modified by effecting a change in the pilot pressure. The flow of the working fluid, which may also function as the control fluid for providing the pilot pressure in the control chamber, is initiated by the vibrating motion of the telescopic suspension fork strut or the shock absorber.

Damping valve arrangement 1 serves to control the pilot pressure that builds up in a control chamber 2. The pilot pressure acts on a spring washer assembly 3 that is able to open a flow passage 4 for the working fluid in a manner that is influenced by the pilot pressure. Spring washer assembly 3 is part of a vibration damper that is designated generally in the drawings by reference numeral 5.

Damping valve arrangement 1 comprises an armature 6 that is arranged in an armature bore 7 of a housing 8 in such manner that it is surrounded on all sides by working fluid. This design renders obsolete the arrangement of sealing fittings that would prevent working fluid from penetrating working area 9 of armature 6. In this context, armature 6 is designed such that the fluid force resulting from the working fluid and acting on the armature is equalized.

Figure 1A:
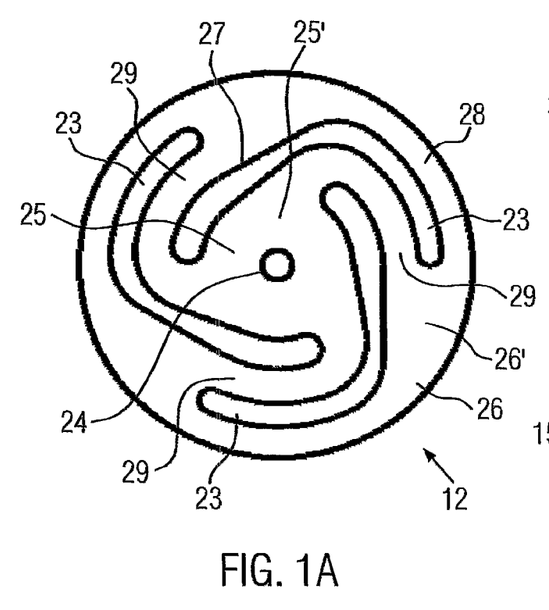
FIG. 1A shows a plan view of a first spring washer of the damping valve arrangement of FIG. 1.
Figure 1B:
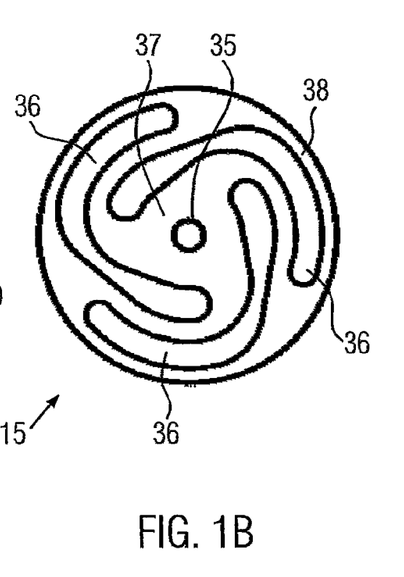
FIG. 1B shows a plan view of a second spring washer of the damping valve arrangement of FIG. 1.

Armature 6 has a central bore 10, in which a guide pin 11 is arranged, on which a spring washer 12 is arranged as shown in FIG. 1A. Spring washer 12 is secured between a pipe shaped armature counterpart 13 in the form of a pipe end and a sleeve body 14, which is also in form of a pipe end. A second spring washer 15, which is represented in FIG. 1B, is arranged on the end area of guide pin 11 opposite the arrangement position of spring washer 12. In this context, second spring washer 15 is secured radially outwardly between a cover 16 and a collar 17 of housing 8. The two spring washers 12, 15 keep armature 6 at a distance from an inner circumferential wall 7' of bore 7.

The two spring washers 12, 15 are each in engagement with guide pin 11 in such manner that they are moved together with guide pin 11 when said pin moves axially in the direction of its longitudinal axis, that is to say the radially inner area of each spring washer is displaced relative to the radially outer area due to the radially outer restraint of each, thus generating a restoring force.

As shown in FIG. 1A and FIG. 1B, due to their configuration both of the two spring washers 12, 15 are constructed to be radially rigid but flexible, that is to say they are constructed to be flexible in the direction extending in the axial longitudinal direction of guide pin 11. This configuration ensures that armature 6 together with guide pin 11 is able to be moved in the axial longitudinal direction of guide pin 11 very rapidly and with low current values; consequently, a very fast displacement movement of armature 6 is possible.

Figures 6A, 6B:
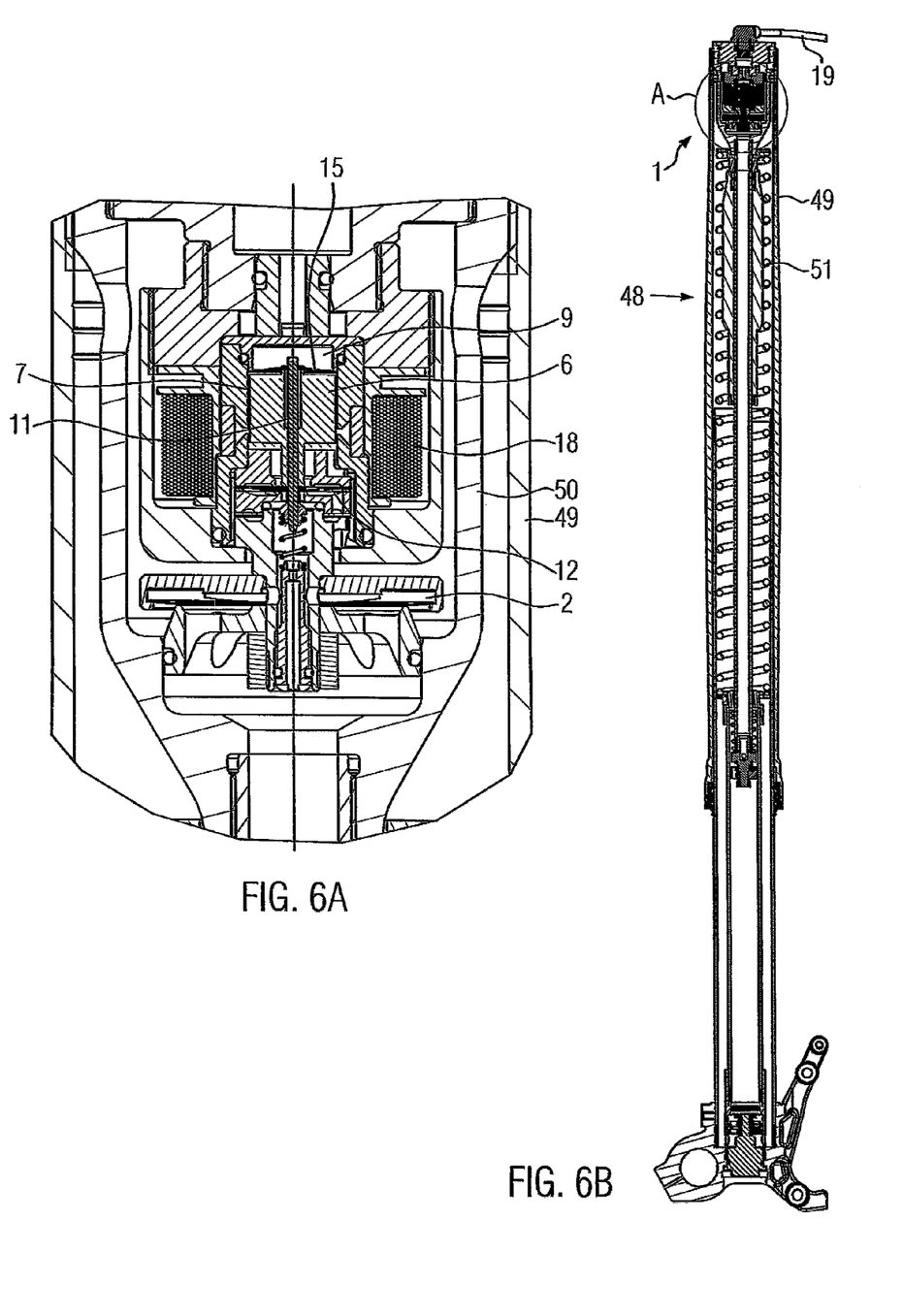
FIG. 6B is a partial cutaway view of a telescopic suspension fork strut with a damping valve arrangement arranged in the area of the upper end of the telescopic suspension fork strut according to an embodiment of the present invention.
FIG. 6A is an enlarged view of cross section "A" in FIG. 6B.
Figure 7:
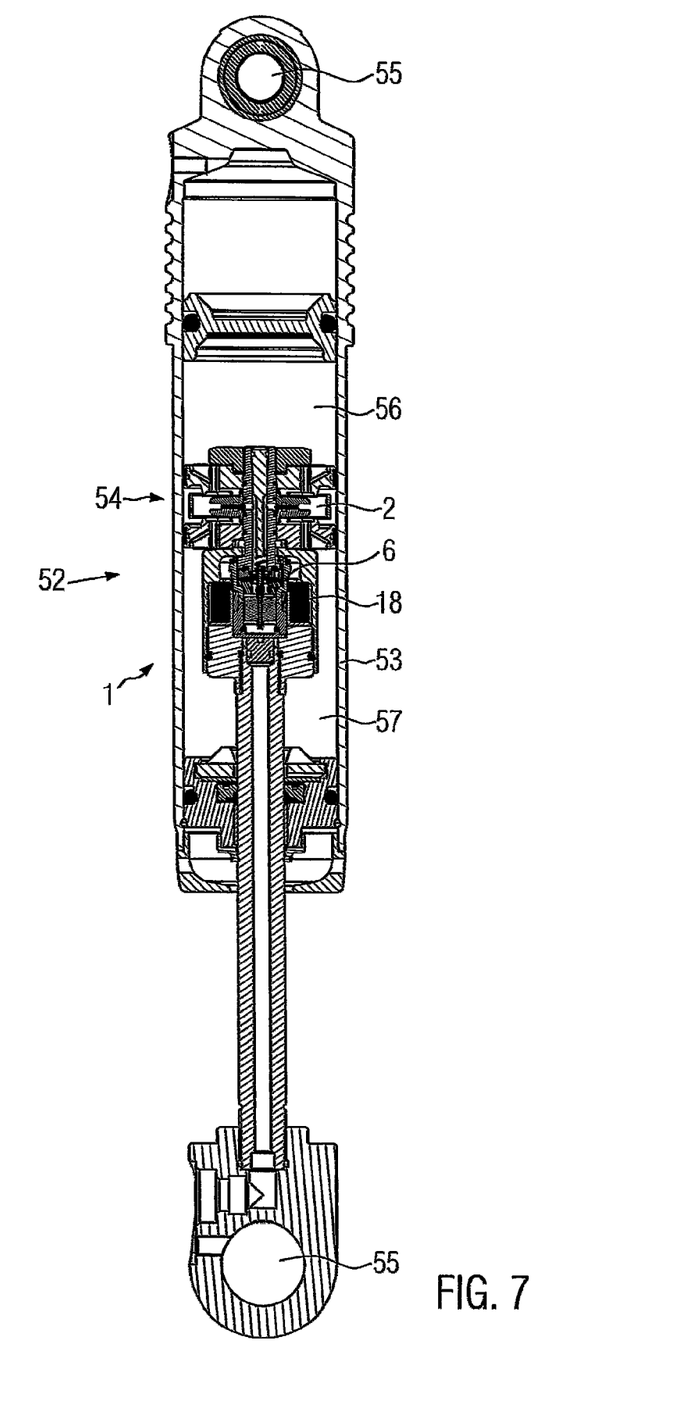
FIG. 7 is a partial cutaway view of a shock absorber with a damping valve arrangement according to an embodiment of the present invention.

In order to displace armature 6 and thus change the pilot pressure prevailing in control chamber 2, an electrically energizable coil 18 is provided, which surrounds armature 6 radially and may be supplied with electrical power through connecting wires 19 shown in FIG. 6B. When electrical power is supplied to coil 18, a magnetic field is created by which armature 6 may be moved in the direction of double-headed arrow 20, wherein spring washers 12, 15 set up only a very weak spring force—due to their very low rigidity in the axial direction—in the opposite direction to the displacement movement of armature 6 caused by the energization thereof; control of coil 18 with lower current values than the current values that triggered the displacement movement or switching off the power supply thus leads to a restoring movement of armature 6 in armature bore 7. In this context, the restoring movement is effected by spring 21 shown in FIG. 1, for example in the form of a screw compression spring, the tension of which may be changed by means of an adjusting screw 22.

FIG. 1A shows a plan view of first spring washer 12, which has a circular disc configuration with three cutouts 23, a central pass-through hole 24 to accommodate guide pin 11, a radially inner area 25 that includes pass-through hole 24, and a radially outer area 26 to which first spring washer 12 may be fixed. The radially inner area 25 forms an inner ring 25' without cutouts, and the radially outer area forms an outer ring 26' without cutouts.

As is shown clearly, cutouts 23 are designed to run from radially inner area 25 toward radially outer area 26 in such manner that, starting from radially inner area 25 at a distance of about half the radius of spring washer 12, they first run substantially toward the circumference of spring washer 12 in an area 27, and then in a further area 28 follow a part of the circumference of spring washer 12 at a distance from the outer circumference of spring washer 12. This configuration has the advantage that the radial rigidity of spring washer 12 is substantially independent of the direction of application of a radial force that is necessary for supporting armature 6, and it has proven advantageous to have three support zones 29 available in this way to provide radial support for armature 6 against housing 8.

In addition, this configuration has significant advantages during production of spring washer 12, since the washer can be produced by a simple punching process, which is hardly possible in the case of a comparable spring washer having a plurality of support areas extending only radially, such as are present in a plate spring with spring tongues, for example, because of the miniaturization that is necessary in order to enable installation thereof in a telescopic suspension fork strut.

The area ratio of spring washer 12 in terms of the area of cutouts to the area of a spring washer without cutouts may have values in the range from about 1 to 1.5 to about 1 to 3. In this way, a spring washer 12 may be produced with strong radial rigidity but weak rigidity in the direction of the deflection movement along the axial longitudinal direction of guide pin 11.

As is also shown in FIG. 1 of the drawing, radially inner area 25 of first spring washer 12 lies flat against an encircling collar 30 of armature counterpart 13 in the form of a pipe end. Radially outer area 26 of spring washer 12 is overlapped by a spacer ring 31, so that radially inner area 25 is fixed in position at a distance from an encircling collar 32 of an annular body 33.

FIG. 1B shows second spring washer 15 that is arranged on end area 34 of guide pin 11. This washer has an inner cutout 35, through which guide pin 11 passes. It also has three cutouts 36 in comparable manner to the design of first spring washer 12, which three cutouts begin from a radially inner area 37 at a distance of about half the radius of second spring washer 15 and extend in a direction toward the periphery of spring washer 15, and then in an area 38 along the circumference of second spring washer 15 (and at a distance therefrom). In this way, the ratio of the radial rigidity to the axial rigidity of second spring washer 15 may be adjusted, wherein the area ratio of cutouts 36 of second spring washer 15 to the area of spring washer 15 without cutouts is in the range from about 1 to 1.5 to about 1 to 3.

Figure 2:
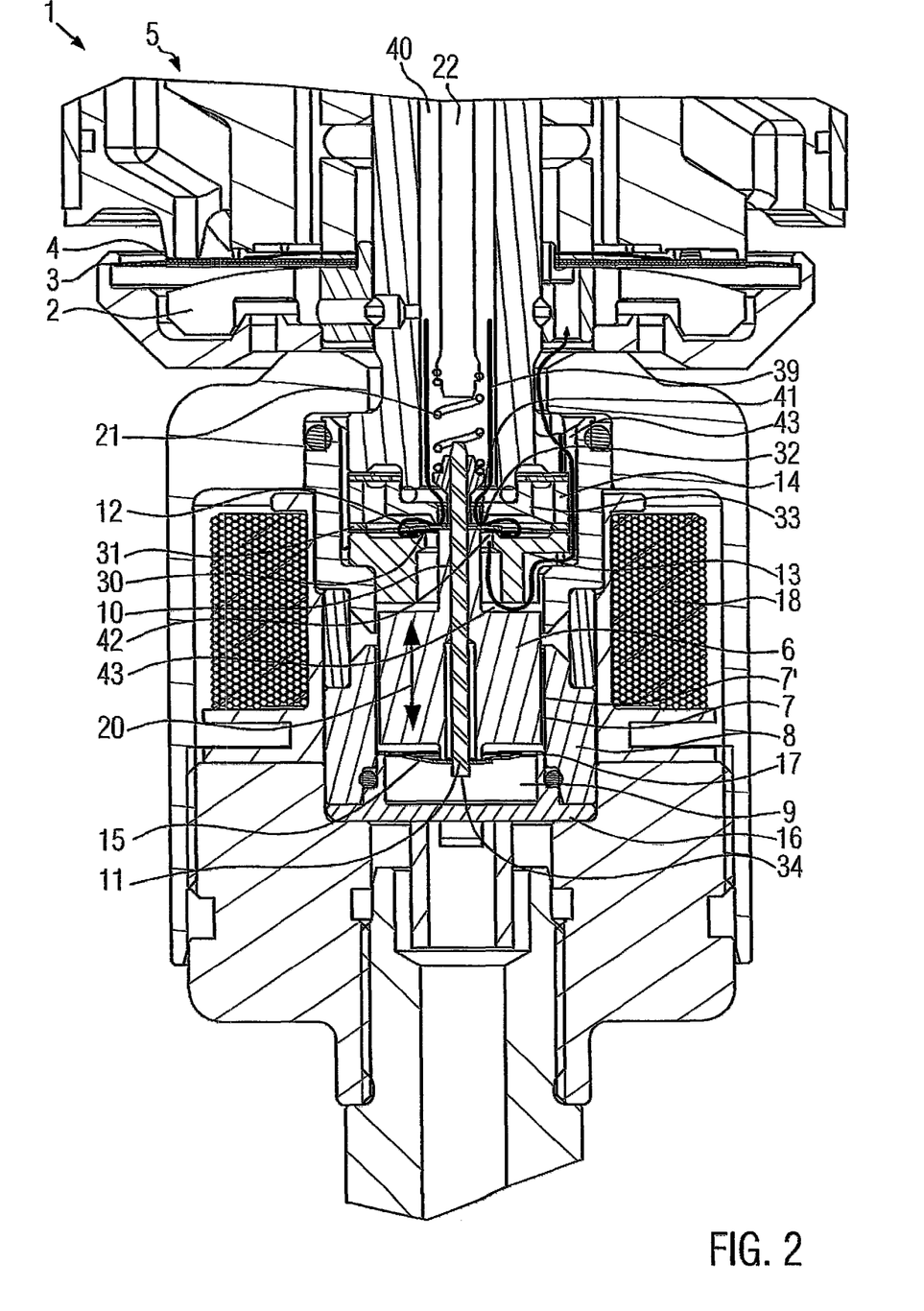
FIG. 2 shows a view similar to that of FIG. 1, in which the armature is energized with low current values.

FIG. 2 of the drawing shows a representation similar to that of FIG. 1. According to FIG. 2, low current values are applied to armature 6, and therefore the pilot pressure built up in control chamber 2 of the vibration damper is low. Consequently, the travelling valve that performs the damping in the form of the spring washers is only exposed to low compressive force, and only slight damping takes place, because the opening cross section available for the flow of the work fluid due to the compressing and extending spring motion of the telescopic suspension fork strut or shock absorber is large and the flow is opposed by little counteracting resistance.

The energization of armature 6 causes armature 6 to be moved in an upward direction against the effect of spring 21 until first spring washer 12 is lifted off encircling collar 30 of armature counterpart 13. In this position, spring washer 12, which may also be referred to as a flexible shim, is located approximately in the axial center between encircling collar 30 and encircling collar 32 of annular body 33. Due to the large distance between first spring washer 12 and encircling collar 32, no significant throttling of the working fluid flow occurs, and pressure loss is very low. In this position of armature 6, damping in the system is low, since only a weak control pressure acts on the travelling valves arranged there, the desired low level of damping is created.

FIG. 2 also shows that working space 9 is filled with working fluid, and it is also shown by the arrows 39 that indicate the direction of flow of the working fluid. The working fluid moves along the annular space 40 created around adjusting screw 22 toward flow-through opening 41, passes through flow-through opening 41 and cutouts 23 in first spring washer 12, then passes through a flow-through opening 42 formed between the underside of first spring washer 12 and the encircling collar 30 of armature counterpart 13, enters an annular space formed between armature 6 and armature bore 7, and from there passes via an annular space 43 formed between armature counterpart 13 and sleeve body 14 on the one hand and housing 14 on the other, and finally flows toward the top of damping valve arrangement 1.

Figure 3:
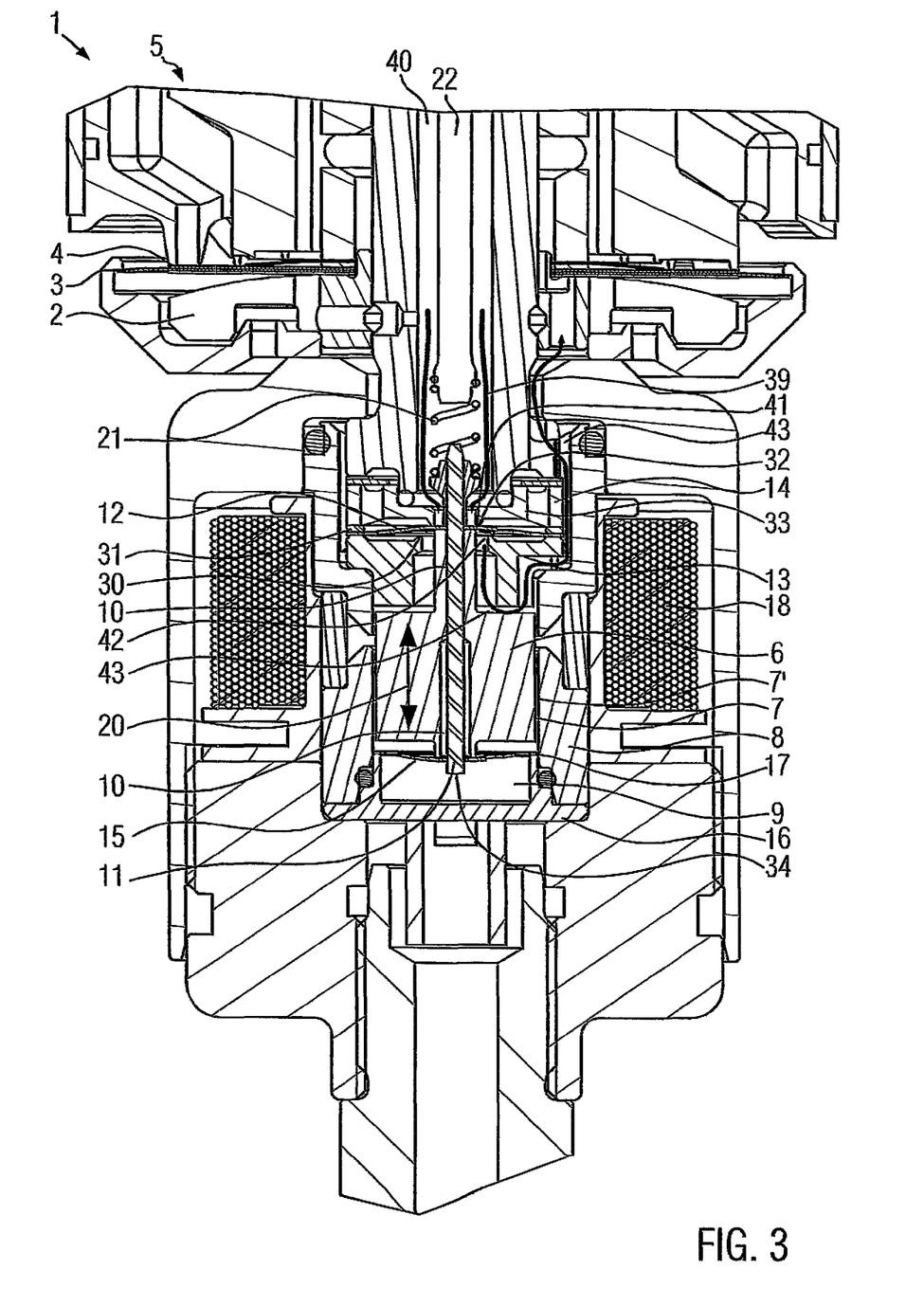
FIG. 3 shows a view similar to that of FIG. 2, in which the armature is energized with higher current values than those in the view of FIG. 2; and consequently a higher pilot pressure is created in the control chamber, and the damping in the system increases.

FIG. 3 of the drawing shows a representation similar to that of FIG. 2, in which armature 6 is energized with larger current values than in the diagram of FIG. 2, and consequently a greater pilot pressure is present in control chamber 2 and damping in the system increases.

The effect of energizing coil 18 with higher current values than is shown by the position of armature 6 in FIG. 2 is that armature 6 moves farther upward in the plane of the drawing than is the case for the position of armature 6 according to FIG. 2.

When coil 18 is energized with higher current values, armature 6 moves upward against the effect of spring 21 until radially inner area 25 of first spring washer 12 almost closes flow-through opening 41 between the upper side of first spring washer 12 and encircling collar 32 of annular body 33. In this way, the throttle gap tends toward zero and a pressure regulation is created. The control pressure in control chamber 2 increases, the travelling valves arranged therein are subjected to high pressure forces, the opening cross section that allows fluid to flow the travelling valves is reduced and the damping in the system is increased.

The control pressure in control chamber 2 may be adjusted using the balance between the force generated by coil 18, the pressure in the system, the spring force of spring 21 and the spring forces of the two spring washers 12, 15. After passing through annular gap 43, the working fluid flows toward the piston unit, which is situated above damping valve arrangement 1 and supports the travelling valves.

Figure 4:
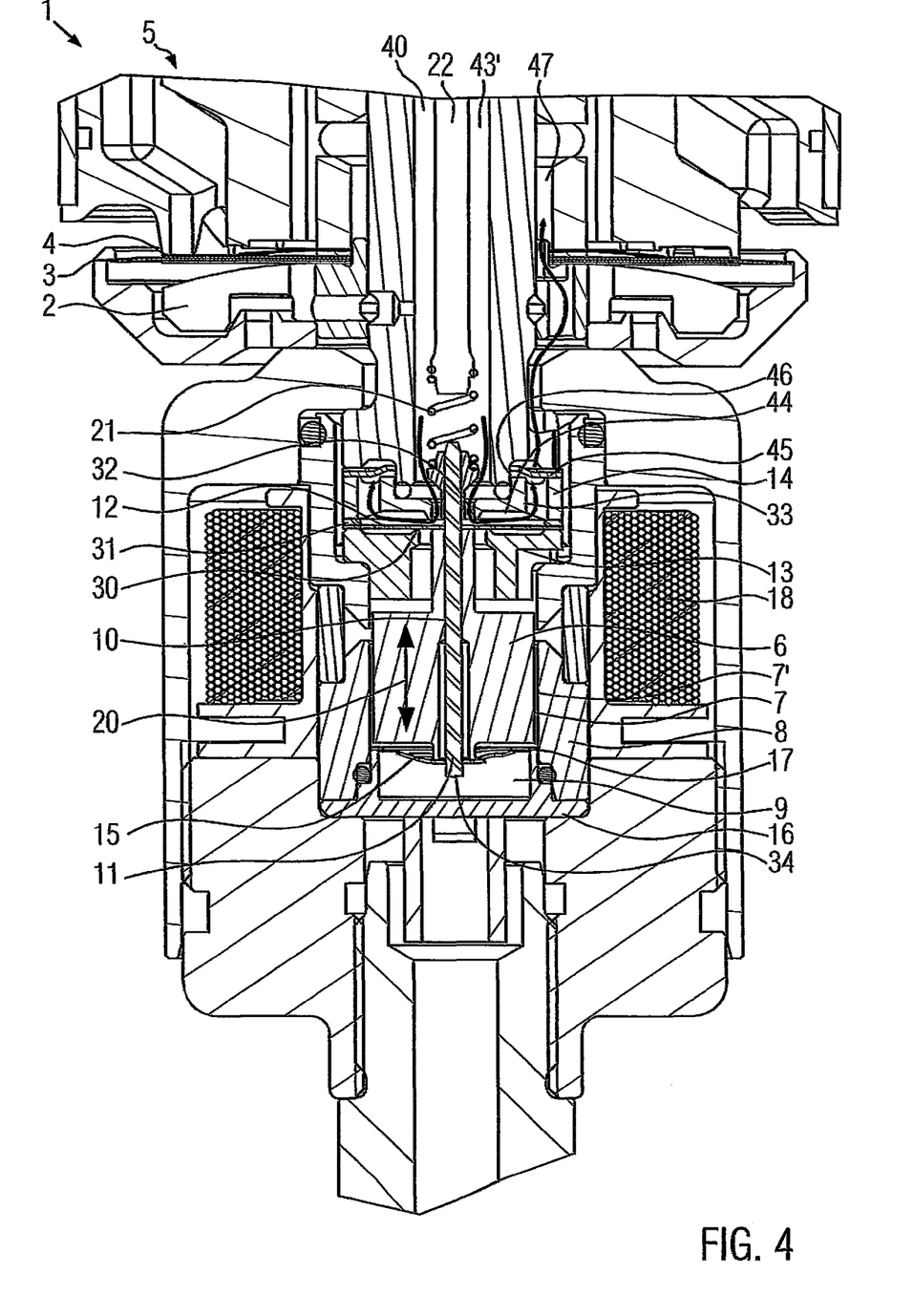
FIG. 4 shows a view to explain the fail-safe function of the damping valve arrangement according to the invention.

FIG. 4 of the drawing shows a diagram to explain the fail-safe function of the damping valve arrangement according to the invention. This functionality is intended for the event that the power supply to the electrically energizable coil 18 suffers a malfunction and energy can no longer be supplied to coil 18.

First spring washer 12 is biased against encircling collar 30 of armature counterpart 13 by spring 21. If working fluid is forced through a fluid inflow passage 43' into annular space 44 between armature counterpart 13 and annular body 33 by the spring motion of a telescopic suspension fork strut or shock absorber, this rise in pressure causes a spring ring 45 to open a bypass passage 46, so that when a predefined opening pressure prevails in annular space 44, working fluid flows from annular space 40 and through annular space 44 and bypass passage 46 to a fluid passage 47 that is directed downstream. In this way, a moderate damping force profile may be achieved, which lies between the damping force profile achievable with the armature position according to FIG. 2 and the damping force profile achievable with the armature position according to FIG. 3.

Figure 5:
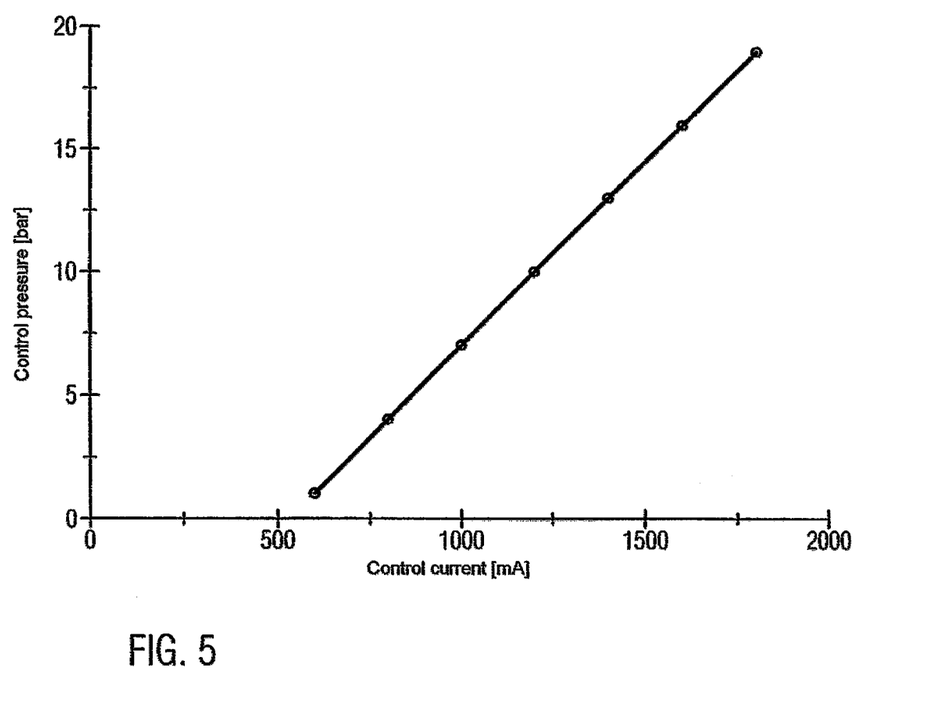
FIG. 5 is a diagram showing the control pressure that is built up in the control chamber, plotted against the control current that is supplied to energize the armature.

FIG. 5 of the drawing shows the progression of the control pressure in control chamber 2, plotted against the control current applied to coil 18. The progression of the control pressure from about 2 bar to about 20 bar (shown solely for exemplary purposes in FIG. 2) may be cycled through within a timeframe of less than 10 ms, which means that the pilot pressure in control chamber 2 may be changed from the minimum value to the maximum value within this narrow timeframe of about 10 ms. This indicates clearly that exceptionally rapid changing of the control pressure inside control chamber 2 is possible by the damping valve arrangement according to the invention, due to the mounting of armature 6 with the two spring washers 12, 15. In this respect, the damping valve arrangement as disclosed benefits significantly from the fact that the system does not suffer from wall adhesion effects of armature 6 in armature bore 7, and that it is also not sensitive to contaminants in the working fluid.

FIG. 6B shows a telescopic suspension fork strut for producing a telescopic suspension fork—not shown further—of a motorcycle, with a damping valve arrangement 1 according to the present invention arranged in the area of the upper end of telescopic suspension fork strut 48. Damping valve arrangement 1 may be inserted in an outer tube 49 from the top end of telescopic suspension fork strut 48 and is supplied with electricity via the connecting wires 19 mentioned previously.

FIG. 6A shows an enlarged view of cross section "A" taken in FIG. 6B with outer tube 49 and damping valve arrangement 1 arranged together with a sleeve 50 for supporting a and guiding the main spring 51 shown in FIG. 6B. This arrangement shows that by miniaturization (primarily due to the absence of sealing fittings for sealing working space 9 for armature 6 and the radial and axial guidance of armature 6 together with guide pin 11 in armature bore 7), and the low level of magnetic force required due to the absence of wall adhesion effects in armature bore 7 (which magnetic force is generated by coil 18), the coil 18 may consequently also be constructed with small total dimensions. The arrangement 1 thus is suitable for arrangement in the constricted space conditions of a tube of a telescopic suspension fork strut 48.

Armature 6 is guided radially and axially in armature bore 7 by two spring washers 12, 15 exactly as shown in the embodiment of FIG. 1, and is able to change the pilot pressure in control chamber 2.

Finally, a shock absorber 52 that may be installed for example in a motor vehicle is shown in FIG. 7. Shock absorber 52 comprises an outer tube 53 and a damping valve arrangement 1 that is disposed in the outer tube so as to be axially displaceable together with a work piston 54. If the two mounting eyes 55 that may be secured to the chassis and body of the motor vehicle (not shown) are moved relative to one another, this causes an axial displacement movement of damping valve arrangement 1 together with work piston 54 in outer tube 53.

Consequently, work fluid is displaced between the two fluid chambers 56, 57 and passes through flow channels to reach damping valve arrangement 1, and may also be used to adjust the pilot pressure in control chamber 2 in response to the displacement movement of armature 6 caused by coil 18.

The ability to modify the pilot pressure in the control chamber means that the regulating forces are significantly lower than any other direct means for regulating damping forces. This may also be used to reduce the power requirement for actuating the coil. With the axial and radial guidance of the armature by means of two spring washers, it is possible to ensure that the armature does not come into contact with other components, and thus functions practically without friction, and in particular that no direct contact occurs between the armature and the armature bore.

The damping valve arrangement according to the invention provides for a marked improvement in comfort in both two-wheeled and four-wheeled vehicles. The greater comfort is achieved by the rapidly variable damping capability which significantly reduces the vibrations of the vehicle body or chassis, and of the tires.

Due to its rapid regulation capability, the damping valve arrangement also makes it possible to reduce the amplitudes of the resonant frequency of unsprung masses in the form of the tire and hub, for example, and of the mass of the superstructure in the form of a vehicle body and the engine for example. By this means it is also possible to reduce vibration of the vehicle caused by uneven travelling surfaces, and the tendency of the vehicle to reverberate after driving over an obstruction may be reduced in the same way.

The stabilization of the vehicle superstructure when driving over obstructions and irregularities that is realized by the damping valve arrangement according to the invention has the effect of improving driving safety, and increasing the traction of the vehicle's driving wheels (as the period of time for which the wheels may not be in contact with the ground is shortened). Also, the braking distance may also be reduced due to the rapid adaptation of the damping force to the conditions of the driving surface or the driving surface base.

The problem of soft damping, that is to say the reverberation effects in vehicle chassis, may be reduced by the damping valve arrangement according to the invention. The damping valve arrangement enables the damping force to be changed within a few milliseconds, the damping force may be changed continuously and adapted to the respective driving situations while the vehicle is in operation.

In addition, with the damping valve arrangement according to the invention it is also possible to take appropriate account of various stress situations due to various additional loads in the vehicle, without the driver having to make changes to the spring damping system on the vehicle, as was previously the case, in such manner that the damping had to be increased or reduced according to the additional load on the vehicle.

Finally, the damping valve arrangement according to the invention is also suitable for motor racing sports, since the damping behavior may be modified in real time as it were, without the need to carry out time-consuming adjustment operations on the vehicle. The otherwise essential use of tools for changing the damping behavior of a vibration damper also becomes unnecessary.

With regard to the features of the invention that have not been explained in greater detail individually, for the rest reference is herewith made explicitly to the claims and the drawing.

LIST OF REFERENCE SIGNS

1 Damping valve arrangement
2 Control chamber
3 Spring washer assembly, travelling valve
4 Flow passage
5 Vibration damper
6 Armature
7 Armature bore
7' Inner circumference wall
8 Housing
9 Working space
10 Bore
11 Guide pin
12 First spring washer
13 Armature counterpart
14 Sleeve body
15 Second spring washer
16 Cover 17 Collar
18 Coil
19 Connecting wires
20 Double-headed arrow
21 Spring
22 Adjusting screw
23 Cutout
24 Passage hole
25 Radially inner area
25' Inner ring
26 Radially outer area
26' Outer ring
27 Area
28 Area
29 Support
30 Encircling collar
31 Spacer ring
32 Encircling collar
33 Annular body
34 End area
35 Cutout
36 Cutout
37 Radially inner area
38 Area
39 Arrow
40 Annular space
41 Flow-through opening
42 Flow-through opening
43 Annular space
44 Fluid inflow passage
45 Spring ring
46 Bypass passage
47 Fluid passage
48 Telescopic suspension fork strut
49 Outer tube
50 Sleeve
51 Main spring
52 Shock absorber
53 Outer tube
54 Work piston
55 Mounting eye
56 Fluid chamber
57 Fluid chamber Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A damping valve arrangement (1) for controlling a pilot pressure, comprising:
   a control fluid by which the pilot pressure exerts influence on a control chamber (2) of a damping device of a vibration damper (5);
   an armature (6) that is displaceable by means of an electrically energizable coil (18) and provided in a housing (8);
   a guide pin (11) arranged in the armature;
   a first spring washer (12), mounted on the guide pin to be movable with the guide pin, and which braces the guide pin; and
   an annular body (33) having an encircling collar (32);
   wherein the first spring washer is movable with the guide pin to change an area of a flow-through opening (41) between the first spring washer and the encircling collar through which the control fluid may flow; and
   wherein the guide pin (11) passes through the armature and has a second spring washer (15) mounted in an end area of the guide pin on an opposite side of the armature from the flow-through opening (41), wherein the second spring washer is movable with the guide pin and provides outwardly radial bracing for the guide pin.

2. The damping valve arrangement (1) according to claim 1, characterized in that the spring washers (12, 15) guide the armature (6) radially and axially in the housing (8) and maintain the armature at a distance from an inner circumferential wall (7') of the housing.

3. The damping valve arrangement (1) according to claim 1, characterized in that the armature (6) is arranged inside the housing (8) in a manner whereby it is surroundable by control fluid.

4. The damping valve arrangement (1) according to claim 1, characterized in that the spring washers (12, 15) have a central cutout (24, 35) to accommodate the guide pin (11), and each of the spring washers is furnished with cutouts (23, 36) extending from a radially inner area (25, 37) of the spring washers to a radially outer area (26, 38) of the spring washers, and at the radially outer area extending along a portion of the circumference of the spring washers at a distance from the outer circumference.

5. The damping valve arrangement (1) according to claim 4, characterized in that the first spring washer (12) has a radially inner area (25) that is free from cutouts (23), and the area for changing the flow-through opening (41) between the inner area and the annular body (33) having an encircling collar (32) may be shifted relative to the collar.

6. The damping valve arrangement (1) according to claim 4, characterized by a pipe shaped armature counterpart (13), separate from the armature and immobile relative to the housing, arranged axially between the first spring washer (12) and the armature (6), which counterpart comprises an encircling collar (30) extending toward the first spring washer, and with which counterpart a radially inner area (25) of the first spring washer may be brought into contact.

7. The damping valve arrangement (1) according to claim 1, characterized in that the guide pin (11) is braceable against the effect of the spring washers (12, 15) by means of an operable spring (21) in such manner that the flow-through opening (41) is opened in predefined manner.

8. The damping valve arrangement (1) according to claim 1, further comprising a bypass passage (46) for bypassing the first spring washer (12) and closable by a spring ring (45), which bypass passage opens at a predefined opening pressure to allow a control fluid stream to flow between a fluid inflow passage (43') extending toward the first spring washer (12) and the control chamber (2) and/or a fluid passage (47).

9. The damping valve arrangement (1) according to claim 4, characterized in that at least one of the spring washers (12, 15) has at least one cutout (23, 36), and the ratio of an area of the at least one cutout (23, 36) in the at least one spring washer to an area of the at least one spring washer (12, 15) without at least one cutout is in the range from 1 to 1.5 to 1 to 3.

10. The damping valve arrangement (1) according to claim 4, characterized in that at least one of the spring washers (12, 15) has three cutouts (23, 36) between an inner ring (25') without a cutout and an outer ring (26') without a cutout.

11. The damping valve arrangement (1) according to claim 1, characterized in that a control pressure in the control chamber (2) can be influenced by a compression force exerted counter to a displacement of the control fluid during a displacement movement of the damping valve arrangement (1), by which a cross section of a flow-through passage (4) of a travelling valve (3) of a damping device of the vibration damper (5) is controllable.

12. The damping valve arrangement according to claim 1, characterized in that the damping valve arrangement (1) is adapted to provide a control pressure in the range from 1 bar to 20 bar acting on a travelling valve (3) in a control chamber (2) of a damping device of a vibration damper (5).

13. The damping valve arrangement (1) according to claim 1, characterized in that the damping valve arrangement (1) is a component of a member selected from the group consisting of a telescopic suspension fork strut (48) of a vehicle, a telescopic suspension fork of a vehicle, and a shock absorber (52) of a vehicle.

14. A damping valve arrangement (1) for controlling a control fluid pilot pressure that exerts influence on a control chamber (2) of a damping device of a vibration damper (5), the arrangement comprising:
- an armature (6) that is displaceable by means of an electrically energizable coil (18) and provided in a housing (8);
- a guide pin (11) passing through the armature and having end areas extending from opposite ends of the armature;
- a first spring washer (12), mounted on a first end portion of the guide pin and movable with the guide pin, and which braces the guide pin relative to an armature counterpart (13), which armature counterpart does not move with the guide pin;
- an encircling collar (30) on the armature counterpart;
- a second spring washer (15), mounted on a second end portion (34) of the guide pin and movable with the guide pin, and which braces the guide pin within the housing;
- an annular body (33) having an encircling collar (32);
- an upper flow-through opening (41), formed between an upperside of the first spring washer and the encircling collar (32) on the annular body, and through which the control fluid may flow;
- a lower flow-through opening (42) formed between an underside of the first spring washer and the encircling collar (30) on the armature counterpart;

wherein the first spring washer is movable with the guide pin to change an area of the upper flow-through opening (41) through which the control fluid may flow; and wherein a second end portion of the guide pin is on the opposite side of the armature from the upper flow-through opening.

* * * * *